United States Patent [19]

Long et al.

[11] 4,268,179
[45] May 19, 1981

[54] METHOD AND SYSTEM FOR REPRODUCING IDENTIFICATION CHARACTERS

[75] Inventors: George R. Long, Newark; Michael C. Smayling, Wilmington, both of Del.

[73] Assignee: E. I. Du Pont de Nemours and Company, Wilmington, Del.

[21] Appl. No.: 88,840

[22] Filed: Oct. 29, 1979

[51] Int. Cl.³ .............................................. B41J 3/20
[52] U.S. Cl. .................................. 400/120; 235/432; 235/487; 128/760; 346/76 PH; 340/146.3 Z; 400/73; 400/103
[58] Field of Search ...................... 400/70, 83, 73, 120, 400/121, 103–106; 346/76 PH; 235/432, 472, 487, 494; 340/146.3 Z

[56] References Cited

U.S. PATENT DOCUMENTS

| | | | |
|---|---|---|---|
| 3,523,522 | 8/1970 | Whitehead et al. | 128/771 |
| 3,612,321 | 10/1971 | Larson | 128/760 X |
| 3,656,473 | 4/1972 | Sodickson et al. | 128/771 |
| 3,688,955 | 9/1972 | L'Huillier | 340/146.3 Z X |
| 3,735,350 | 5/1973 | Lemelson | 235/472 X |
| 3,831,006 | 8/1974 | Chaffin et al. | 235/487 X |
| 3,848,112 | 11/1974 | Weichaelbaum et al. | 235/487 X |
| 3,859,632 | 1/1975 | Etter | 35/35 R |
| 3,900,094 | 8/1975 | Larsen et al. | 101/93.05 X |
| 3,913,719 | 10/1975 | Frey | 400/126 X |
| 3,949,363 | 4/1976 | Holm | 340/146.3 C X |

OTHER PUBLICATIONS

IBM Tech. Disc. Bulletin, by E. Uberbacher, vol. 19, No. 1, Jun. 1976, pp. 177–178.

Primary Examiner—Paul T. Sewell

[57] ABSTRACT

A method and system are described for producing identification characters that are both man and machine readable. The identification characters, such as those on a patient's I.D. bracelet or an inventory control tag, are scanned with an optical character reader. The character information obtained from the reader, or other input source, is processed and used to control the reproduction of the identification characters using a dot matrix printer. The readability of the characters is enhanced by using thermal paper and increasing the heat applied by the dot matrix printer to (1) enlarge the area of the dots and (2) increase their optical absorbance. The increased area and absorbance produces an apparent solid line character which is more easily readable by an optical character reader.

13 Claims, 10 Drawing Figures

METHOD AND SYSTEM FOR REPRODUCING IDENTIFICATION CHARACTERS

BACKGROUND OF THE INVENTION

It has been known for some time that wherever humans are involved in a process or procedure, the chance for error exists. In laboratories, warehouses, hospitals and the like, patients, samples, or inventoried items are assigned identification numbers and labels or tags are made bearing such number. As the patients, samples or items are processed, it is necessary in many cases that new labels be made bearing the same identification numbers. Desirably this new label must be readable either by man or by machine. This is particularly true in the case of hospital patients, whose wrist bracelet I.D. number is read and reproduced many times to identify specimens, doses of medicine and the like. If this creation of new labels is left to human foibles, a certain percentage of the time, an incorrect identification number will be created.

It is highly desirable therefore that some method and/or system be devised whereby a given label may be read and additional labels accurately reproduced, one after the other, with each reproduced label in turn capable of being readable and reproducible without necessarily referring back to the original label. Any one of the reproduced labels must be machine readable for comparison or checking purposes to ascertain if say a particular hospital patient is the proper one to receive a dose of medicine, diagnostic test, or the like.

There is described in U.S. Pat. No. 3,656,473 issued to Sodickson and Rubin, a method and apparatus for reading and reproducing bar code type labels for patient identification purposes in hospitals. While this is a good system, a problem arises in that this type of bar code, which is the same as that typically used in grocery store items, is only machine readable. Additional characters must be used before it becomes man readable. Furthermore, equipment for printing these bar code lines and spaces is quite critical and accordingly, printers which can produce good quality bar codes are relatively expensive. A further problem encountered with the Sodickson and Rubin approach is that the master tag must be used each time a reproduced tag or label is required.

SUMMARY OF THE INVENTION

According to one aspect of this invention, a method is provided for reading identification characters, printed on a first substrate, and reproducing those characters on a second substrate in a form that is both man and machine readable. This may be accomplished using a dot matrix printer and an optical character reader. The method comprises the steps of scanning the characters printed on the first substrate with the optical character reader to obtain information as to the identity of the characters, and using the identity information to control the dot matrix printer to form apparent solid line characters of dots, that are nonreflective of radiation from the character reader, on a second substrate. The second substrate is reflective of radiation from the character reader. Such apparent solid line characters are capable of being read with an optical character reader. Obviously the characters could be reflective and the substrate nonreflective.

In a preferred method, the characters are thermally formed by a dot matrix type printer on the second substrate. The method may include the step of forming the character's dot regions that are thermally modified to absorb radiation and thereby provide characters which are visually readable by man and which are also machine readable. The characters may be formed by increasing the heat supplied to each dot position or region on the second substrate. This enlarges the area of each dot, and in the extreme, the dots overlap. Also, it improves the contrast of each dot position so that it is less reflective to radiation from the character reader. These two factors result in forming dots comprised of apparent solid lines. The heat applied to the thermal substrate may be increased by various techniques such as by increasing the time of application of an electrical signal to each energized dot position or by increasing the amplitude (voltage and/or current) of the electrical signal applied to each energized dot position.

A system for implementing this method for reproducing identification characters from a first substrate on a second substrate, which characters are both man and machine readable, comprises a dot printer for forming apparent solid line characters of multiple dots, an optical character reader for scanning the characters on the first substrate to obtain information as to the identification characters, means coupled to the character reader for processing the information, and means for selectively transferring the processed information to the dot printer for forming the identification characters on the second substrate.

The character reader may illuminate the substrate in a predetermined spectral range and the substrate reflects the predetermined spectral range of illumination. The dots forming the characters absorb the predetermined spectral range of illumination and the system includes means for enhancing the spectral absorbance of the dots. This enhancement may be provided by a thermal printer in which the thermal energy applied to each dot position on the second substrate is increased.

With this method and this system, in the environment of a hospital for example, a single identifying set of characters (I.D. number), may be used for each patient. These identification characters may be imprinted on a wrist band and attached to the patient. In a typical use of the method and system, when a sample of body fluid is taken from the patient, the I.D. number on the patient's wrist band is electronically read and reproduced so that an I.D. in the form of a label may be attached to the sample and later used to make additional labels in seriatim (one from another) as often as necessary.

BRIEF DESCRIPTION OF THE DRAWINGS

Further advantages and features of this invention will become apparent upon consideration of the following description wherein.

DETAILED DESCRIPTION OF THE PREFERRED EMBODIMENTS

This invention overcomes many of the difficulties of the prior art in producing and reproducing identification characters. It does this by providing a method and a system for first reading simple optical character recognition (OCR) sized and configured characters (alpha numeric), which can be generated initially, for example, on element (ball) typewriters. Tags or labels with identification (or other) characters appearing thereon can be read using a conventional OCR reader and reproduced on another label using relatively low cost, simple thermal or other type printers. Thermal printers are particularly desired because of their low cost, minimum maintenance, and quiet mode of operation. They have found wide use in calculators, chart recorders, and the like, have good reliability, are cheap, generally have only one moving part, and are available from multiple suppliers.

Figure 1:
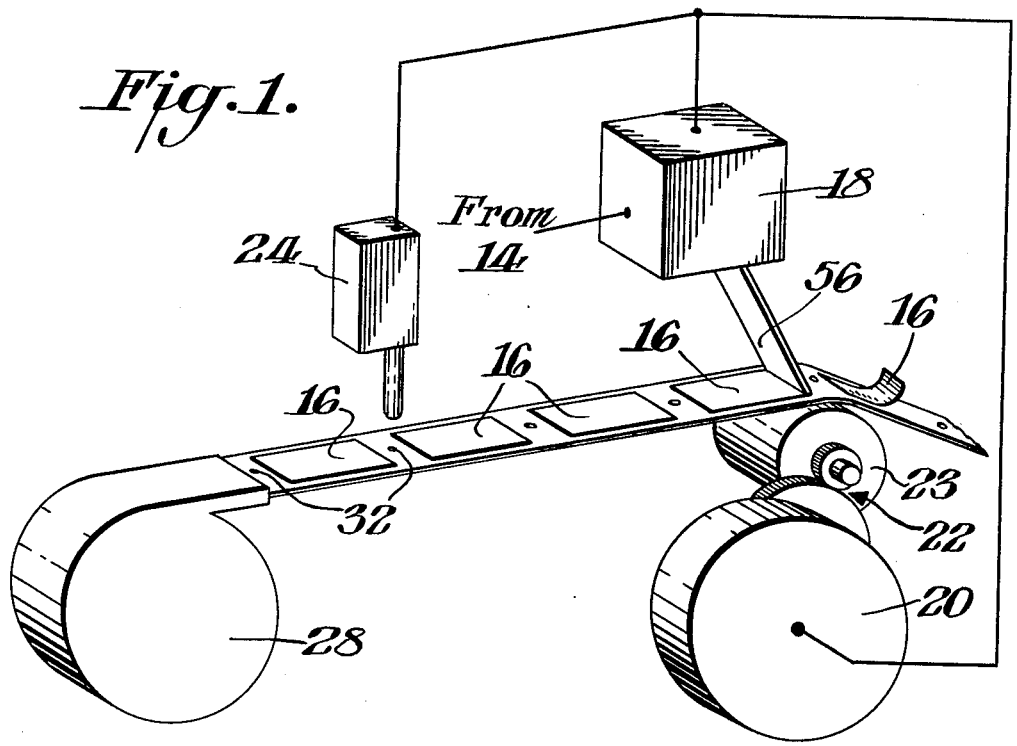
FIG. 1 is a pictorial representation of a thermal label reproducing system constructed in accordance with this invention.
Figure 2:
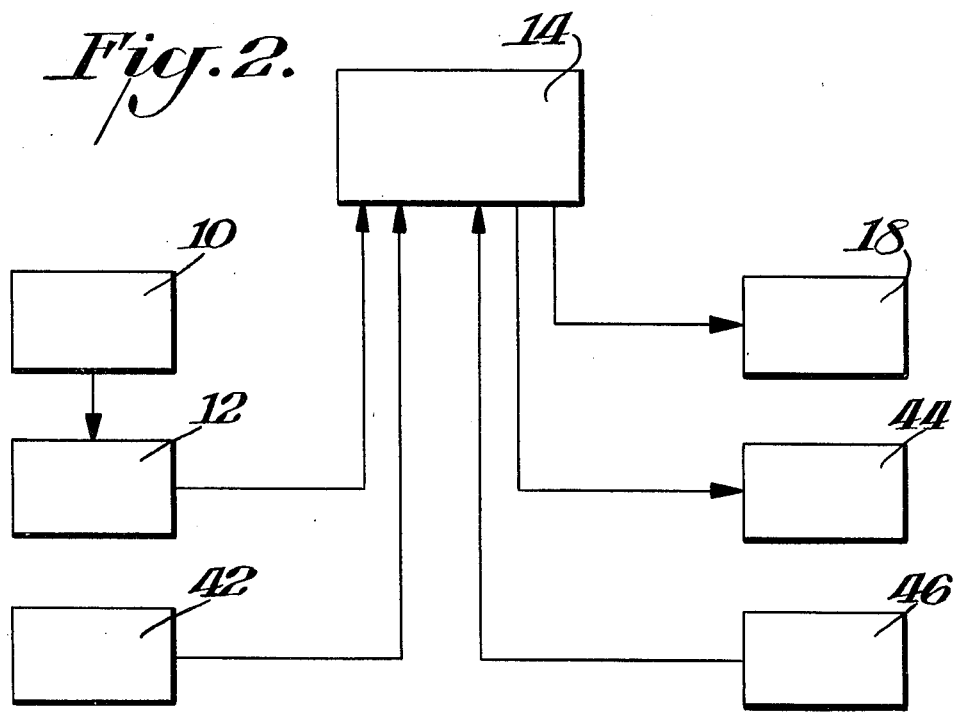
FIG. 2 is a block diagram depicting the relationship electronically between the optical character reader, microcomputer, the thermal printer and other auxiliary devices that may be used in the system of this invention.
Figure 3:
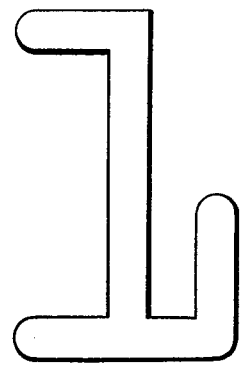
FIG. 3 is an enlarged representation of a character that may be read using an optical character reader.

A system that can be used for reading and reproducing identification (I.D.) characters is depicted in FIGS. 1 and 2. Using the system illustrated, OCR characters of the type, for example, illustrated in FIG. 3, may be read using an OCR reader depicted by the block 10 of FIG. 2. OCR readers are available from many suppliers, one being Recognition Products, Incorporated of Dallas, Tex. Their WAND TM reader constitutes a complete optical character recognition system capable of reading machine printed data, editing the data, and transmitting the data to a user device. Typically, the reader is a hand-held unit. Data or information from the OCR reader 10 is passed to an interface 12, which processes the electrical signals from the OCR reader 10. This OCR reader is used to scan a line of machine printed characters and convert the optical characteristics of the line of characters into electrical signals. The interface, which may be a Universal Asynchronous Receiver Transmitter chip (TI9902), converts the electrical signals, identifying the characters, into a form acceptable to a microcomputer 14. In a preferred embodiment of this invention, the microcomputer includes a microprocessor chip (TI9900), a read only memory, a read/write memory, and appropriate input/output circuitry all of conventional design. The microcomputer may be programmed to operate according to the flow diagrams of FIGS. 9 and 10, as will be described. Alternatively, the electronic information may be processed by a hard-wired system.

The machine printed characters (FIG. 3) are read by the reader 10 by translating the optical characteristics of the data, i.e., the line of characters, to electrical signals. The OCR reader 10 accomplishes this by illuminating the label or substrate 16 (FIG. 1) on which the identification characters appear and focusing the reflected light energy on a photosensor array. The electrical output of the array conditions the data, recognizes the characters and prepares the data for output to the interface 12 and microcomputer 14. The characteristics of the substrate, its quality and its format influence the ability of the reader 10 to achieve reliable operation. The microcomputer 14 processes the information derived from the interface 12 into a form suitable for use by a thermal or other printer 18. Since the OCR reader, the interface 12 and the microcomputer 14 do not form a part of this invention, they need not be described further. They are all well-known units that are available commercially. Suffice it to say that the OCR reader operates reliably only if solid line or essentially solid line characters are read.

This invention makes possible the reading and printing of such lines. The thermal printer 18 includes a print head, which is driven in accordance with the data to be printed, and functions to control the operation of the drive (stepping) motor 20 and, through the mechanical linkage 22, the withdrawal of support tape 26 from a supply reel 28. Label substrates 16, with an adhesive backing, of suitable thermal paper may be secured to the support tape 26. The support tape 26, which may be in the form of a release paper, to which the adhesive backing of substrate 16 is adhered, may be driven past or under the print head 56 of the printer 18 by a suitable precision drive such as an indexing sprocket or, as illustrated, a rubber support roll 23 (FIG. 1). If desired, the position of each label or substrate 16 may be detected by a photocell 24 which controls the cutoff of each advance sequence of the drive motor 20 by detecting a dot or other suitable indicia 32 on each substrate 16. Alternatively the microcomputer can automatically control the advance of the tape 26 by a predetermined amount through the use of a sprocket (not shown).

Figure 7:
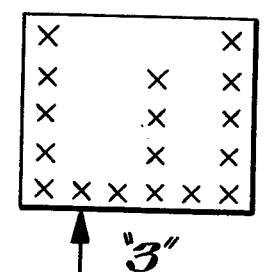
FIG. 7 depicts a typical character font of the type used in a 6×5 character printer.
Figure 4:
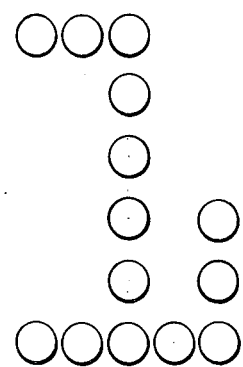
FIG. 4 is a representation of a typical character, such as that depicted in FIG. 3, reproduced using a dot matrix type printer.

The thermal printer may be any of those that are used and available on the market today. One suitable printer that has been used successfully in the method and system of this invention is that made by Gulton Industries of East Greenwich, R.I. who sell a printer known as the GAP-101. This particular printer contains a Gulton DM-10101 dot matrix graphics printing head. This print head is a 101 dot linear array suitable for both graphics and character printing. This printer is modified in accordance with a preferred embodiment of this invention by using only six dots. Printing is accomplished down the paper rather than across the paper (see FIG. 7). This printer, reduced to six thermal elements (one for each dot) of heat application to the thermal paper, will normally apply heat in the row-by-row manner illustrated in FIG. 7, forming a dot matrix such as that depicted in FIG. 4 for the numeral "1". The resulting printed character on the thermal substrate appears as a series of dots such as may be seen by the number "1" in FIG. 4. Each dot may be circular as illustrated, but in the usual case they are rectangular.

The print head of the Gulton printer consists of rows of thermal elements spaced approximately 0.015 inches apart. The elements may be connected in a matrix format, although the matrix becomes a vector in the case of a single current source. Smaller elements placed closer together would provide a corresponding increase in print resolution, although the present spacing is adequate for numeric and some alpha characters. A minimum of 6 print elements and one current source connection are needed to allow printing the 6×5 font shown in FIG. 7. A dot matrix produced by such a print head, however, has been found to be highly unreliable when read by an OCR reader, since apparent solid line characters are needed.

Figure 5:
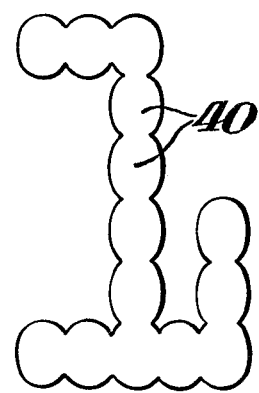
FIG. 5 is a representation of a typical character, such as that depicted in FIG. 3, produced using the method and system of this invention.

According to this invention the electric drive for the print head is modified so that the dot matrix is overdriven to produce the enlarged or overheated regions or dots 40, one configuration of which is seen most clearly in FIG. 5. This is accomplished so as to provide the necessary substrate reflectance, voids and print and nonreflective print characteristics as is required for OCR readers.

These criteria which affect the ability of an OCR to read characters are known. Many known OCR readers such as the OCR WAND TM Reader produced by Recognition Products, operate in the near infra-red spectral region. As is described in their manual, "OCR WAND TM Reader Media Manual", copyright 1977, the ability of the OCR to read a character is a function, inter alia, of the print contrast ratio (PCR) of the character. PCR is a term which describes the contrast between a printed character and the background on which it is printed. The character typically is printed using an ink having a PCR of 50 percent or greater as measured in the near infra-red spectral response range. The PCR is measured using a Macbeth PCM-II (C scale) with a silicon sensor spectral response in the near infra-red 600 to 1200 nm range), i.e., the response range of the OCR.

Suitable papers have been found to include the 3M Type 171, Texas Instrument TR-60, Texas Instrument TR-61, Labelon's Regular thermal paper and the 3M Type 161. Other thermal papers may be used as well provided they have the necessary reflectance and absorbance characteristics in the thermal print areas as is required for the OCR reader. By way of example, the 3M type papers are described in U.S. Pat. No. 2,663,654, issued Dec. 22, 1953 to 3M Company.

Figure 6:
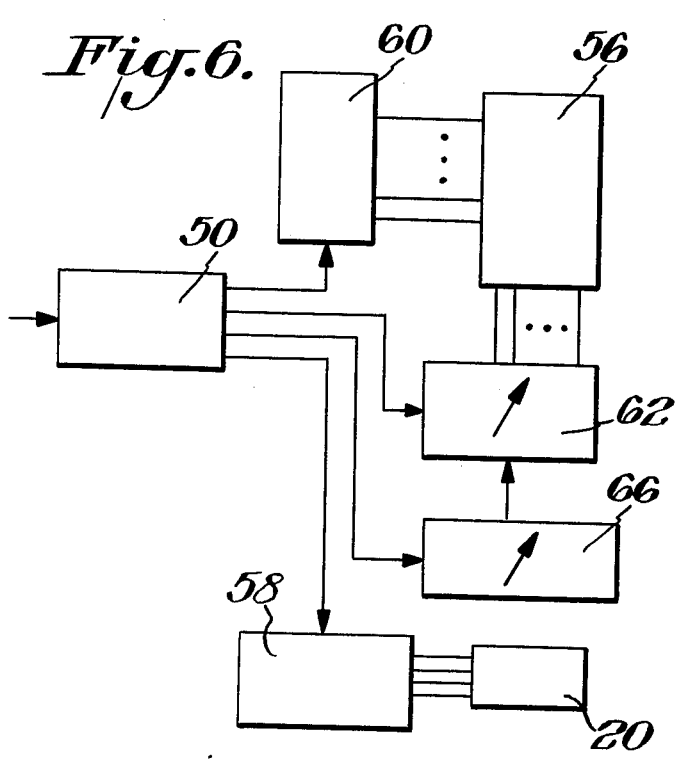
FIG. 6 is a block diagram illustrating the details of the printer depicted in FIG. 2.

To achieve this characteristic, the thermal paper is printed with increased electrical power, either by increased voltage, current or time of application at each of the dot or thermal element regions of the printer as depicted by the adjusting arrows in the blocks 62 and 66 of FIG. 6. This is accomplished by modifying the operating parameters of the drive circuitry for a print head.

Figure 8:
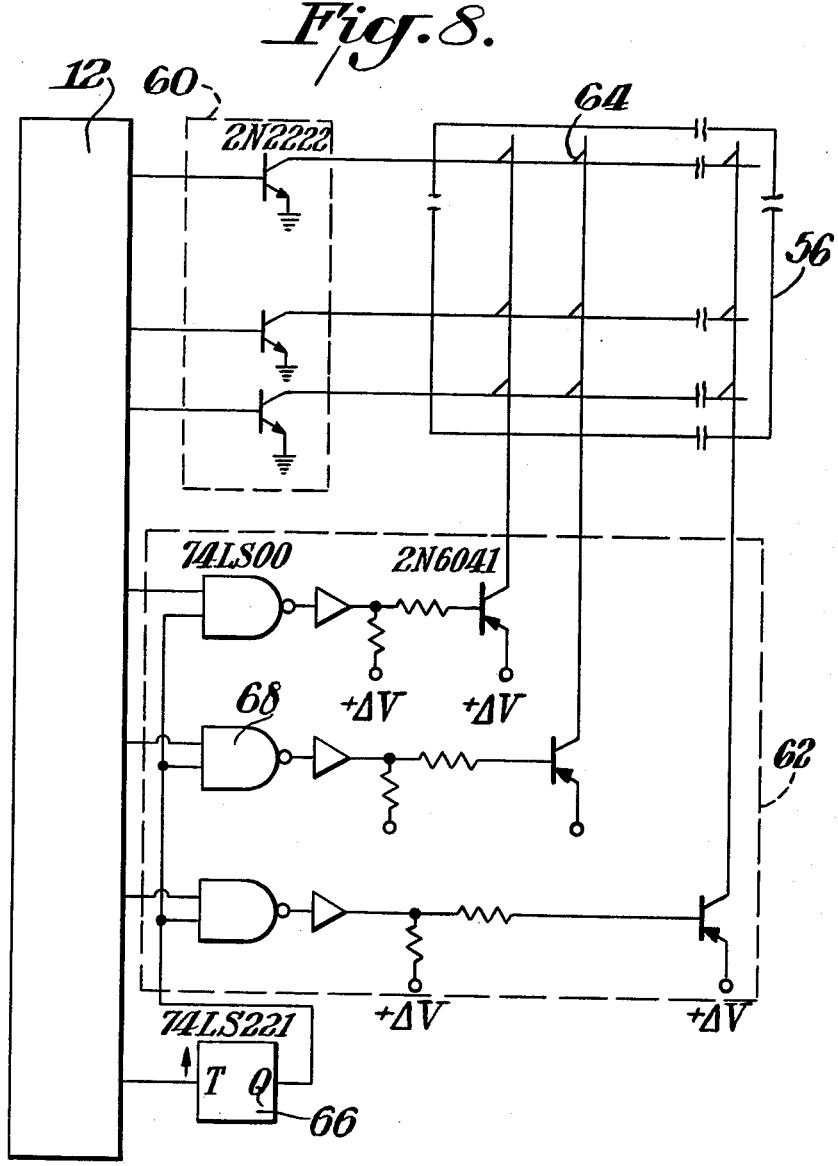
FIG. 8 is a partial block and partial schematic diagram of a typical drive circuit for a thermal print head modified in accordance with this invention.

In a typical case the thermal elements 64 of the print head 56, depicted in FIG. 8, are driven by the coincidence of current sink drivers 60 and current source drivers 62. The thermal elements 64, which are resistive type elements, are depicted by way of general disclosure here in the form of a matrix even though, as described above, it is preferred that the print head in this application operate as a single row of thermal elements. The current sink drivers 60 are single stage NPN transistor inverters and can be driven by CMOS or TTL logic levels, and have open collector outputs which are connected to the respective thermal elements 64 in the print head 56. In a typical case the transistors are capable of providing a current sink for a minimum current of 150 milliamperes (ma). The current source drivers 62 are gated PNP Darlington Transistor Inverters. They can be driven by CMOS or TTL logic levels and have open collector outputs which are connected to the thermal element 64 and the print head 56. The transistors are capable of providing a current source of a minimum of 150 ma times the number of print elements to be driven. The drivers are enabled by a print pulse, derived from an adjustable single shot multivibrator 66, for a preset time. They drive logic gates 68 which control the operation of a transistor drive circuitry as depicted in FIG. 8.

In accordance with a preferred embodiment of this invention, this pulse width, adjustable from 1 to 10 milliseconds, is adjusted according to the particular type of thermal paper used to provide dot constituted characters having the requisite absorption characteristics for an OCR reader, i.e., an apparent solid line. For the Type 161 paper, the single shot 66 is set to produce a stable 6.8 millisecond pulse for enabling the current source drivers 62. This 6.8 millisecond pulse provides the dot enlargement or blurring of the type depicted in FIG. 5 which improves the readability such that the thermal printer may now be read by an OCR reader.

By thus overdriving the print head, the dot matrix character formed thereby tends to become enlarged and more absorbing of radiation from the OCR reader within the necessary spectral regions. Both of these factors cooperate to form a more continuous character, i.e., one that is an apparent solid line character which is more visually readable as well as machine readable. In the extreme case the dots 40 blur into each other as depicted in FIG. 5 and form an actual solid line character. Alternatively, to provide the increased thermal energy to the print head 56 in accordance with this invention, the voltage $\Delta V$ applied to the current source driver 62 may be increased.

Returning to the description of the method and system of FIG. 2, the thermal printer 18 may be actuated by a suitable keyboard input device 42 and it may operate a suitable display device such as a CRT tube 44 for displaying whatever is being printed for checking purposes. Additional storage in the form of a storage cassette 46 may be provided if desired. Since these devices 42, 44 and 46 are all conventional design and do not constitute part of this invention, they need not be described further.

The block diagram depicted in FIG. 6 illustrates the details of the printer 18. These elements depicted in FIG. 6 are all conventional, but nevertheless for the sake of making a complete disclosure, they will be described generally.

The printer interface 50, which receives information to be printed from the microcomputer 14 (FIG. 2), provides parallel output of data from the microcomputer to the various thermal element drivers (FIG. 8) of the printer. The data is latched and stable for time durations determined by the computer as will be described. The printer interface 50 controls the operation of the current sink drivers 60 and the current source drivers 62 which together energize the various thermal elements constituting the print head 56. The print head prints a row of characters at a time as the paper moves transversely (perpendicularly) to the row of characters as is depicted, for example, in FIG. 7 in which the byte or character 3 is depicted as constituting five rows, each constituting 6 dots, each dot being formed by an individual thermal element in the print head.

The paper advance is controlled by a stepping motor 20 as previously described. The stepping motor in turn is driven by motor drivers 58 (FIG. 6) which are controlled by the printer interface. The motor drivers typically in the Gulton printer are NPN Darlington transistor inverters capable of providing a sink for motor current which is typically 500 ma. The stages are driven by CMOS or TTL logic levels. For a four-phase motor, four drivers are required. The stepping motor 20 advances the paper by increments of approximately 0.021 inch per motor step. Steps are controlled by which phases are energized by the motor drives. Half steps can be obtained to increase printing resolution. A gear reduction typically is required to convert the motor step into the correct paper advance increment. This, of course, may be adjusted as desired according to the application.

Before describing the printer further, it should be noted that the microcomputer 14 (FIG. 2) acts as the system controller. It accepts inputs from the various interfaces, makes decisions based on these inputs, and produces outputs to other interfaces according to the flow diagrams of FIGS. 9 and 10. As noted, these flow diagrams may be implemented by either software, when the microcomputer is used, or by hardware. The microcomputer also provides 25 millisecond timing pulses for the printer motor and it handles asynchronous inputs. Program, data, and printing font storage are in the microcomputer memory.

Figure 9:
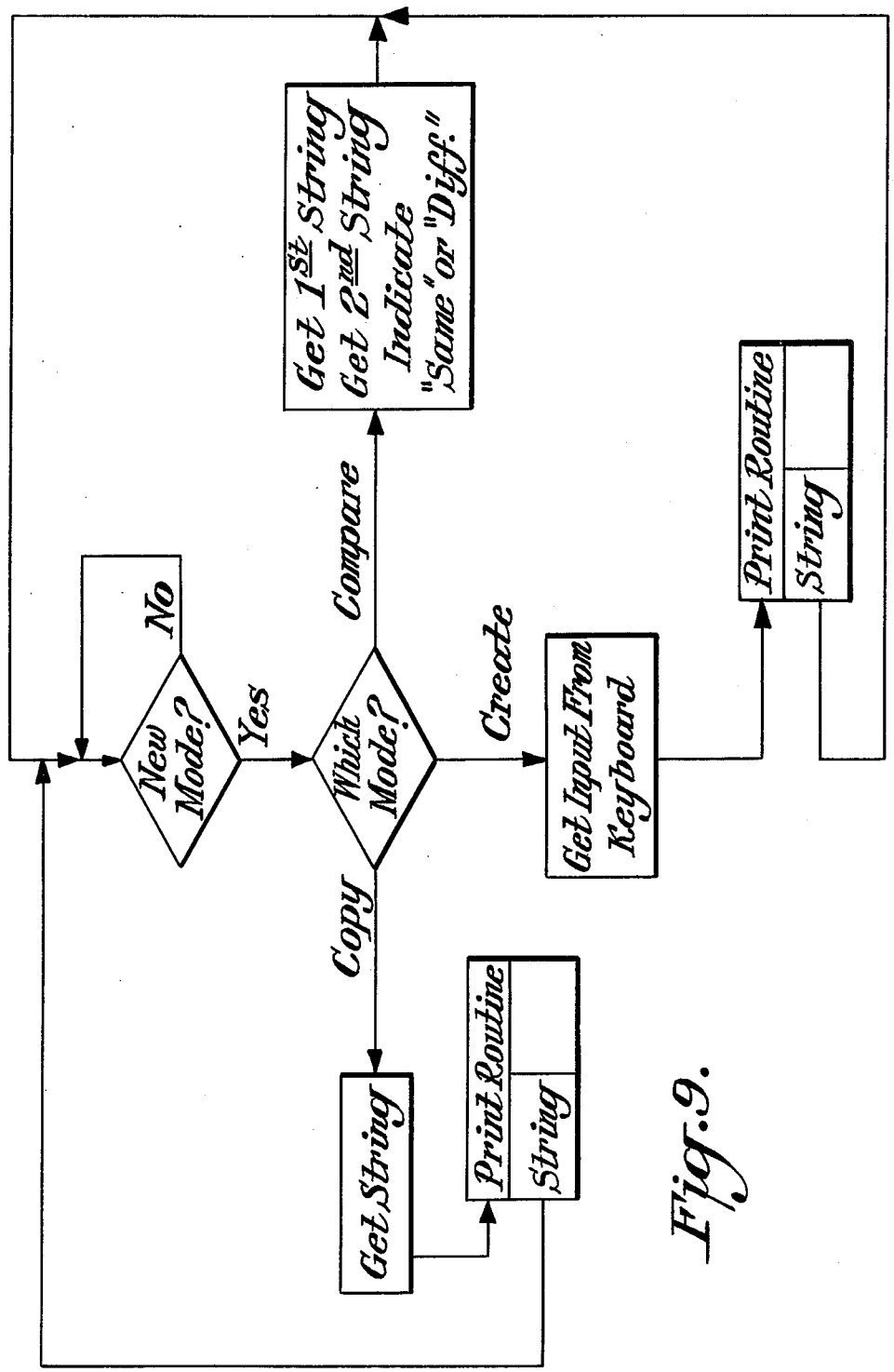
FIG. 9 is a flow diagram used to print, copy or compare characters using the optical character reader and thermal printer.
Figure 10:
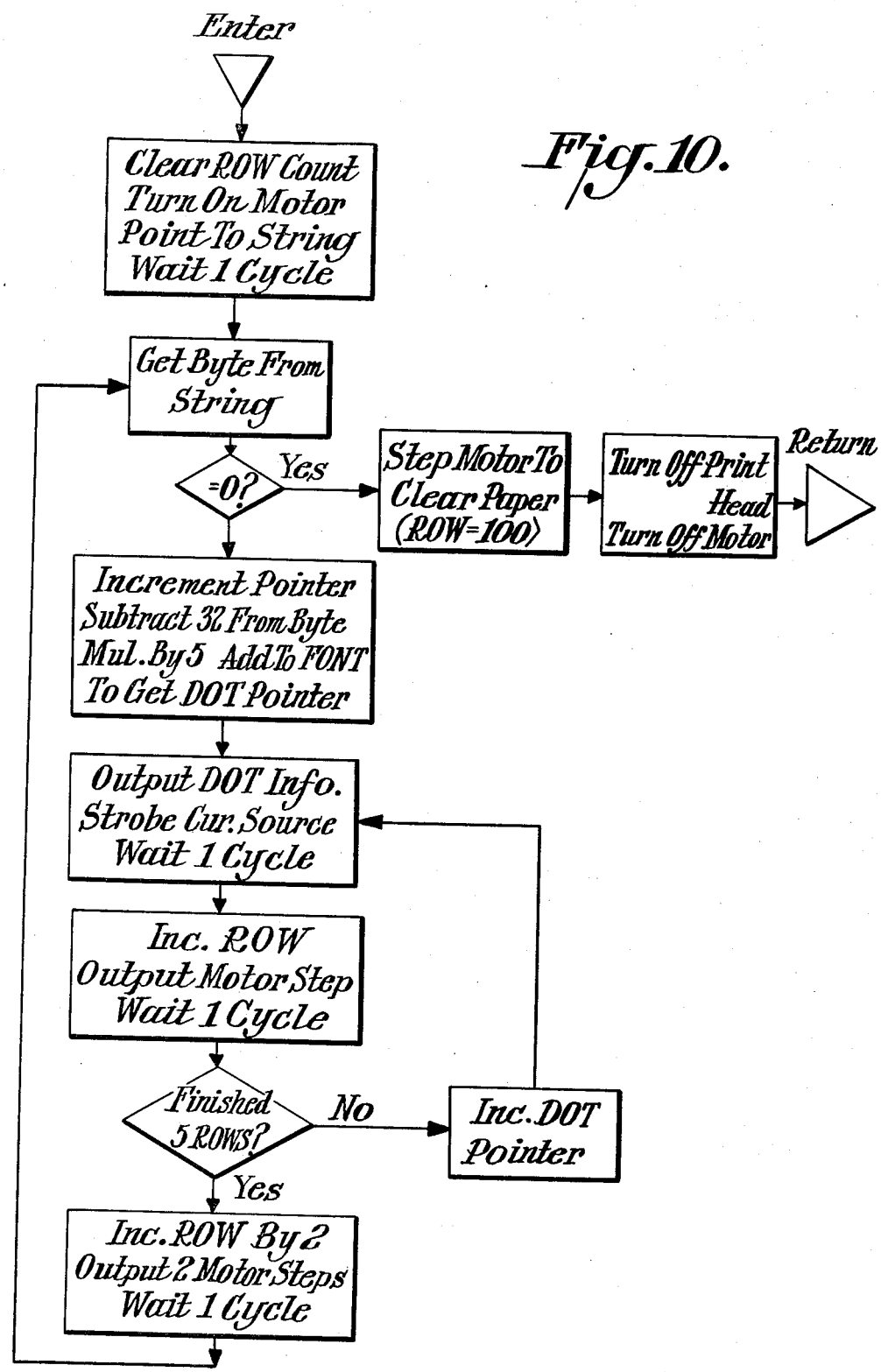
FIG. 10 is a flow diagram of a print routine used to control the thermal printer.

The microcomputer software allows the system to function in three basic modes as shown in FIG. 9. These modes differ in where the string data comes from and where it goes. Each mode is user selectable from the keyboard, and operates on the data string as described below.

The "copy" mode takes data from the OCR interface 12 and produces an OCR readable copy using the thermal printer 18. The number of copies produced per input is user selectable. Input is checked for proper length and a check digit verification can be done.

The "compare" mode takes two consecutive inputs from the external device and tells the operator if the input strings are the same or different. The input strings are checked for validity as in the copy mode.

The "create" mode takes input from the operator interface 42 and prints a string using the thermal printer 18. Control characters and check digits can be added to the printed string.

The printer routine controls the sequence of turning on current sink drivers 60, current source drivers 62, print pulse single-shot 66 and the motor drivers 58. The timing is accurately controlled since the routine is clock driven. A typical print (FIG. 10) sequence description follows.

The data string is broken down character by character. Each character points to a font table in memory which contains the data for which print element is to be turned on or off. Additionally, the position of the stepping motor 20 is needed to correct the font pointer since each row in a character is printed individually. Hence, for a particular character and a given row, a pre-defined set of current sink drivers 60 is turned on. A current source driver 62 is turned on, and the print pulse single-shot 66 is triggered to actually energize the selected print elements. Note that in the 6×5 font only one "current source driver" is used and it is pulsed every time a row is printed. After a row is completed, the routine waits until the next clock cycle to update the row count and output the corresponding phase information to the stepping motor. This delay insures that the print elements 64 have cooled below the thermal threshold of the paper before the paper advances. No printing begins on the new row for a clock cycle after the new phase information is output. This delay allows the paper to stop before new dots are printed.

Additional rows are printed in an identical manner until all rows of all characters are completed. A fast motor stepping (one step per clock cycle) advances the paper a preset distance to allow space between printed strings.

It is to be understood that, although a thermal printer is described herein as being the most desirable from a cost and simplicity standpoint, alternatively one may use any of the known other type of OCR character printers such as an optical printer which images a radiation image on a suitable photosensitive or photopolymer paper. Alternatively, an ink jet printer of the type described, for example, in U.S. Pat. No. 3,913,719 may be used or an impact type printer such as that described in U.S. Pat. No. 3,900,094 may be used.

In each case, it is necessary only that the printer provide a character having a maximum contrast between the substrate and the character. Further, the character itself must be formed of apparent solid lines, such as have good optical density and resolution such as may be required to meet the specifications of a typical OCR reader.

We claim:

1. A method of reproducing identification characters from a first substrate on a second substrate that are both man and machine readable using a dot matrix printer and an optical character reader comprising the steps of:
    scanning the characters on said first substrate with said optical character reader to obtain information as to said identification characters,
    transmitting said information to control said dot matrix printer in accordance with said information on said first substrate to form characters of a matrix of dots, at least some of which overlap, so that said characters have apparent solid lines that are capable of being read with an optical character reader.

2. A method of claim 1 wherein said characters are thermally formed on said second substrate, said substrate being reflective to radiation from said character reader.

3. A method of claim 2 which includes the step of thermally forming said characters of regions of absorbance to radiation from said character reader on said second substrate.

4. A method of claim 3 wherein said regions absorb in the near infrared and said character reader emits radiation in the near infrared.

5. A method of claim 3 which includes the step of forming said characters by increasing the heat supplied to each dot position on said second substrate to enlarge the area of the dot.

6. A method of claim 5 wherein the heat is increased to provide actual overlaps between adjacent dot positions.

7. A method of claim 3 which includes the step of forming said characters by increasing the heat supplied to each dot position on said second substrate, thereby to increase the contrast between said dot positions and said second substrate.

8. A method of claim 5, 6 or 7 wherein the heat is increased by increasing the time of applications of electrical signal at each energized dot position.

9. A method of claim 5, 6 or 7 wherein the heat is increased by increasing the amplitude of the electrical signal applied to each energized dot position.

10. A system for reproducing identification characters from a first substrate that are both man and machine readable on a second substrate comprising:
    a dot matrix printer for forming characters of dots, at least some of which partially overlap such that said characters have apparent solid lines capable of being read by an optical character reader, an optical character reader for scanning said characters on said first substrate to obtain information as to said identification characters, means coupled to said character reader for processing said information, and means for selectively transferring said processed information to said dot matrix printer for forming said identification characters on said second substrate.

11. A system of claim 10 wherein said character reader illuminates said substrates in a predetermined spectral range and said substrate reflects said predetermined spectral range of illumination.

12. A system of claim 11 wherein said dots forming said characters absorb said predetermined spectral range of illumination and which includes means for enhancing the spectral absorption of said dots.

13. A system of claim 12 wherein said dot matrix printer is a thermal printer and said enhancing means includes means to increase the thermal energy applied to a dot position on said second substrate.

* * * * *